(12) United States Patent
Faulkner

(10) Patent No.: US 7,487,493 B1
(45) Date of Patent: Feb. 3, 2009

(54) METHOD AND APPARATUS FOR DEVELOPING STANDARD ARCHITECTURE COMPLIANT SOFTWARE FOR PROGRAMMABLE RADIOS

(75) Inventor: Bow John Faulkner, Montague, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 808 days.

(21) Appl. No.: 10/747,453

(22) Filed: Dec. 30, 2003

(51) Int. Cl.
  *G06F 9/44* (2006.01)
  *H04M 3/00* (2006.01)
(52) U.S. Cl. .......... 717/105; 717/107; 456/418
(58) Field of Classification Search .......... 717/105, 717/107; 455/418
  See application file for complete search history.

(56) References Cited

U.S. PATENT DOCUMENTS

| | | |
|---|---|---|
| 5,729,748 A | 3/1998 | Robbins et al. |
| 5,835,771 A | 11/1998 | Veldhuizen |
| 6,002,867 A | 12/1999 | Jazdzewski |
| 6,026,238 A | 2/2000 | Bond et al. |
| 6,032,152 A | 2/2000 | Pearson |
| 6,041,180 A | 3/2000 | Perks et al. |
| 6,093,215 A | 7/2000 | Buxton et al. |
| 6,182,279 B1 | 1/2001 | Buxton |
| 6,195,794 B1 | 2/2001 | Buxton |
| 6,349,404 B1 | 2/2002 | Moore et al. |
| 6,405,368 B1 | 6/2002 | Freyburger |
| 6,553,268 B1 | 4/2003 | Schwenke et al. |
| 7,191,429 B2 * | 3/2007 | Brassard et al. ............ 717/104 |
| 2002/0073397 A1 | 6/2002 | Yoshida et al. |
| 2002/0095654 A1 | 7/2002 | Fukase et al. |
| 2002/0178434 A1 | 11/2002 | Fox et al. |
| 2003/0023577 A1 * | 1/2003 | Sundius et al. ............ 707/1 |
| 2003/0093769 A1 | 5/2003 | Kumar |

OTHER PUBLICATIONS

"An Introduction to a UML Platform Independent Model of a Software Radio", M. Barbeau et al., International Conference of Telecommunications (ICT), Beijing, China, 2002, pp. 1-6, retrieved from the internet at <http://www.scs.carleton.ca/~barbeau/Publications/> on Jun. 8, 2007.*

"Using Rational Rose 4.0," 1996, Rational Software Corporation, pp. i-xvi, 1-219.*

(Continued)

*Primary Examiner*—Eric B Kiss
(74) *Attorney, Agent, or Firm*—Edell, Shapiro & Finnan, LLC

(57) ABSTRACT

A method and apparatus is described for generating a standard software communication architecture (SCA) compliant waveform application for a software defined radio. An application shell generator is used to separate implementation of software radio software resources from implementation of software radio waveform functionality. In this manner, an additional layer of abstraction is defined and enforced between software resource objects that control access to a set of physical abstraction layer SCA core framework API's and waveform functionality. This additional abstraction layer assures that the physical abstraction layer API's only interact with architecture compliant source code. The source code, derived from software resource templates, also assures portability of the generated software radio waveform application to other SCA compliant platforms.

37 Claims, 4 Drawing Sheets

OTHER PUBLICATIONS

Quatrani, "Visual Modeling with Rationale Rose and UML", Booch & Jacobson—Addison/Wesley, Apr. 1998 ch. 1-12, Appendix A.

Kulp, James, "Status and Activity in the OMG Relevant to HPEC", Mercury Computer Systems, Inc, Sep. 2002.

Zeligsoft; "Waveform Builder" (including Waveform Builder's Application View and Platform View): retrieved from the Internet: www.zeligsoft.com; 10 pages, no date given.

Zeligsoft; "Automated SCA Compliance; Model-driven automated generation and validation of SDR application"; Waveform Builder; retrieved from the Internet: www.zeligsoft.com; 3 pages, no date given.

Zeligsoft; "Zeligsoft Inc. Announces the Release of Waveform Builder 1.0 Offering Model-Based Software Radio Descriptor Generation and Validation"; retrieved from the Internet: www.zeligsoft.com; 2 pages, no date given.

Zeligsoft; "Waveform Builder"; retrieved from the Internet; www.zeligsoft.com; 1 page, no date given.

Zeligsoft; "Automated Generation"; retrieved from the Intenet: www.zeligsoft.com; 1 page, no date given.

Zeligsoft; "Application Across Industries"; retrieved from the Internet: www.zeligsoft.com; 1 page, no date given.

Zeligsoft; "Quality by Construction"; retrieved from the Internet: www.zeligsoft.com; 1 page, no date given.

Zeligsoft; "Model Portability"; retrieved from the Internet: www.zeligsoft.com; 1 page, no date given.

Zeligsoft; "Professional Services"; retrieved from the Internet: www.zeligsoft.com; 1 page, no date given.

Zeligsoft; "Automated Validation"; retrieved from the Internet: www.zeligsoft.com; 1 page, no date given.

Zeligsoft; "SCA Compliance"; retrieved from the Internet: www.zeligsoft.com; 1 page, no date given.

Bordeleau, F. et al.; "Tools for Commercial Component Assembly"; 7 pages, no date given.

Hogg, J.; "Model-Driven*: Beyond Code Generation"; Zeligsoft, May 20, 2004, Version 1.0; 26 pages.

Hogg, J.; "Applying UML 2 to Model-Driven Architecture"; IBM Software Group, Oct. 17, 2003, Version 2.0; 46 pages.

"UML 2.0: Exploiting Abstration and Automation"; Editorials and Opinions; SD Times; retrieved from the Internet; 4 pages, no date.

Zamora, J.P., et al.; "From a Specification Level PIM to a Design Level PIM in the Context of Software Radios"; Third Workshop on UML for Enterprise Applications: Model Driven Solutions for the Enterprise; 19 pages, no date.

Willink, E.D.; "Definition of Reactive Systems Using the Waveform Description Language"; SDR Forum and AFRL/IFG Waveform Development Environment Workshop; Nov. 1, 2000; 30 pages.

Kovarik, V.; "Software Defined Radio"; Next Level Solutions; pp. 1-12.

Harris dmTK & Spectrum SCA BSP; "SCA Core Framework and Toolset for SDR-3000 Series Software Define Radio Platform"; Spectrum Signal Processing; Aug. 7, 2003; 5 pages.

"Joint Tactical Radio System (JTRS)"; Version 3.2, JROC Approved, JROCM 087-03; Apr. 9, 2003.

"JTRS Policy 003; Joint Tactical Radio System (JTRS) Waveform Specification Standardization"; Department of the Army; Aug. 27, 2003; 10 pages.

Szelc, D.; "API Position Paper"; SDRF-03-1-0030-V1.0; Jun. 18, 2003; 7 pages.

Ubnoske, M.; Software Communications Architecture (SCA); Apr. 2003; pp. 1-8.

"Joint Tactical Radio System (JTRS) SCA Developer's Guide"; Raytheon Company; Contract No. DAAB15-00-3-001 Document No.: Rev. 1.1; Jun. 18, 2002; pp. 1-78.

Willink, E.D.; "Definition of Embedded Software using the Waveform Description Language"; Software Defined Radio Forum; Sep. 12, 2000; pp. 1-26.

"Software Communications Architecture Specification"; Modular Software-programmable Radio Consortium; MSRC-5000SCA, V2.2; Nov. 17, 2001.

* cited by examiner

METHOD AND APPARATUS FOR DEVELOPING STANDARD ARCHITECTURE COMPLIANT SOFTWARE FOR PROGRAMMABLE RADIOS

BACKGROUND OF THE INVENTION

1. Field of the Invention

The present invention pertains to the development of software for programmable radios. In particular, the present invention pertains to generating standard architecture compliant waveform software applications for programmable radios.

2. Description of the Related Art

A software defined or programmable radio (SDR) is analogous to a computer in that users can tailor its capabilities to meet specific needs by using relatively generic hardware and loading multiple software waveform applications that meet identified requirements. A software defined radio or software radio is flexible, by virtue of being programmable, to accommodate various physical layer formats and protocols.

A software defined radio converts analog radio signals of different frequencies into digital data. The bits are processed by software running on a microprocessor. Software controls functionality such as frequency, modulation, bandwidth, security functions, and waveform requirements. Software-programmable, hardware-configurable radio systems provide increased interoperability, flexibility, and adaptability to support the varied operational requirements of specific user populations. Such software radios are typically built upon an open system architecture that supports technology insertion through evolutionary acquisition or preplanned product improvement. Software radios that support evolutionary acquisition or preplanned product improvement may be modularly upgraded with modified hardware and/or software modules. For example, modular upgrades can be used to expand data throughput rates per channel, to expand the number of communication channels supported, and/or to increase levels of reliability, availability, and maintainability supported by the software radio.

One example of a software radio is the Joint Tactical Radio (JTR) System (JTRS). A JTR is a software radio that is independent of the hardware platform employed and based upon the JTRS Software Communication Architecture (SCA). The JTRS SCA is an open architecture framework that tells designers how elements of hardware and software are to operate in harmony within the JTRS. An SCA Hardware (HW) Framework identifies minimum design specifications that must be met by SCA compliant hardware devices, or platforms. An SCA Core Framework defines a set of application programming interfaces (API's) that serve as an abstraction layer between a software defined radio waveform application and services provided by an SCA compliant hardware platform.

Unfortunately, although open software radio architectures, such as the JTRS SCA, support customized designs, evolutionary acquisition and preplanned product improvement, the architectures are typically complex. The complexity of such architectures poses unique challenges to software radio development projects attempting to develop software radios in compliance with the architecture. For example, implementation of a JTRS SCA compliant radio set using conventional software development techniques typically requires the development team members to have a working knowledge of multiple computer languages and technologies, including CORBA, IDL, POSIX, XML, C++, multithreading, and make-files.

Typically, developers experienced with a target waveform to be supported by a JTR under development must surmount this JTRS technology learning curve before they can contribute waveform specific knowledge to the development project. Understanding the intricacies of the JTRS standard and related technologies typically takes an experienced software engineer a daunting six months. Added to this learning curve are the technical demands and challenges posed by the execution and testing of the developed software in an event driven, real-time radio set.

Another drawback associated with the JTRS SCA, is the lack of an enforcement mechanism to ensure that software radio developers adhere to SCA guidance. For example, SCA guidance requires SCA compliant waveforms to be implemented in a manner that is logically separated from the services supported by an SCA compliant hardware platform. Although the SCA provides for such separation via the SCA core framework API's, there is currently no way to ensure that developers preserve the integrity of the API based abstraction.

For example, waveform engineers who are unfamiliar with designing software radios in compliance with the SCA open architecture typically experience difficulty visualizing the new radio set architecture because they are accustomed to envisioning radio set resources and radio set waveforms as integrated entities. As a result, SCA architecture API related guidance is often purposefully and/or inadvertently modified and/or bypassed thereby violating the SCA core framework abstraction of the services provided by the physical radio set to the software radio waveform application. As a result, portability of the software radio waveform application to other SCA compliant physical platforms is compromised.

Hence, a need remains for a method and apparatus that allows software communication architectures, such as the JTRS SCA, to deliver timely and cost effective software defined radio waveform applications that are modular, standard architecture compliant and portable to any standard architecture compliant hardware platform capable of providing the physical services required by the software radio waveform functions. Typically such physical services include receipt of input from a human computer input device or keypad, transmission/receipt of physical radio signals, physical audio input/output via a radio device microphone/speaker, physical modem access, physical network access, etc.

Preferably, such an approach would reduce the technical programming knowledge and standard architecture specific knowledge required of a waveform engineer to implement a standard architecture compliant software radio waveform application. Further, such an approach should provide a software radio development team with a structured development environment that assures that software radio application waveforms are implemented in a manner that complies with standard architecture guidance and preserves the integrity of defined standard architecture abstraction layers.

OBJECTS AND SUMMARY OF THE INVENTION

Therefore, in light of the above, and for other reasons that may become apparent when the invention is fully described, an object of the present invention is to assure that software radio waveform applications are implemented in a manner that complies with standard architecture guidance and preserves the integrity of architecture abstraction layers.

Another object of the present invention is to deliver software radio waveform applications that are modular, architecture compliant and portable to any architecture compliant hardware platform capable of providing the physical services required by the software radio waveform functions.

Yet another object of the present invention is to reduce the technical programming skills and architecture specific knowledge required of developers to implement an architecture compliant software defined radio waveform application.

Still another object of the present invention is to reduce developer time and development costs associated with the development of architecture compliant software radio waveform applications.

A further object of the present invention is to improve the consistency and reliability of software radio waveform applications.

A still further object of the present invention is to increase software radio design options and the ability to flexibly adapt a software radio design to accommodate new requirements and/or previously unforeseen conditions.

The aforesaid objects are achieved individually and in combination, and it is not intended that the present invention be construed as requiring two or more of the objects to be combined unless expressly required by the claims attached hereto.

A method and apparatus is described for generating a standard software communication architecture (SCA) compliant waveform application for a software defined radio. An application shell generator is used to separate implementation of software radio software resources from implementation of software radio waveform functionality. In this manner, an additional layer of abstraction is defined and enforced between software resource objects that control access to a set of physical abstraction layer SCA core framework API's and waveform functionality. This additional abstraction layer assures that the physical abstraction layer API's only interact with architecture compliant source code. The source code, derived from software resource templates, also assures portability of the generated software radio waveform application to other SCA compliant platforms.

The above and still further objects, features and advantages of the present invention will become apparent upon consideration of the following detailed description of specific embodiments thereof, particularly when taken in conjunction with the accompanying drawings wherein like reference numerals in the various figures are utilized to designate like components.

DETAILED DESCRIPTION OF THE PREFERRED EMBODIMENTS

Figure 1:
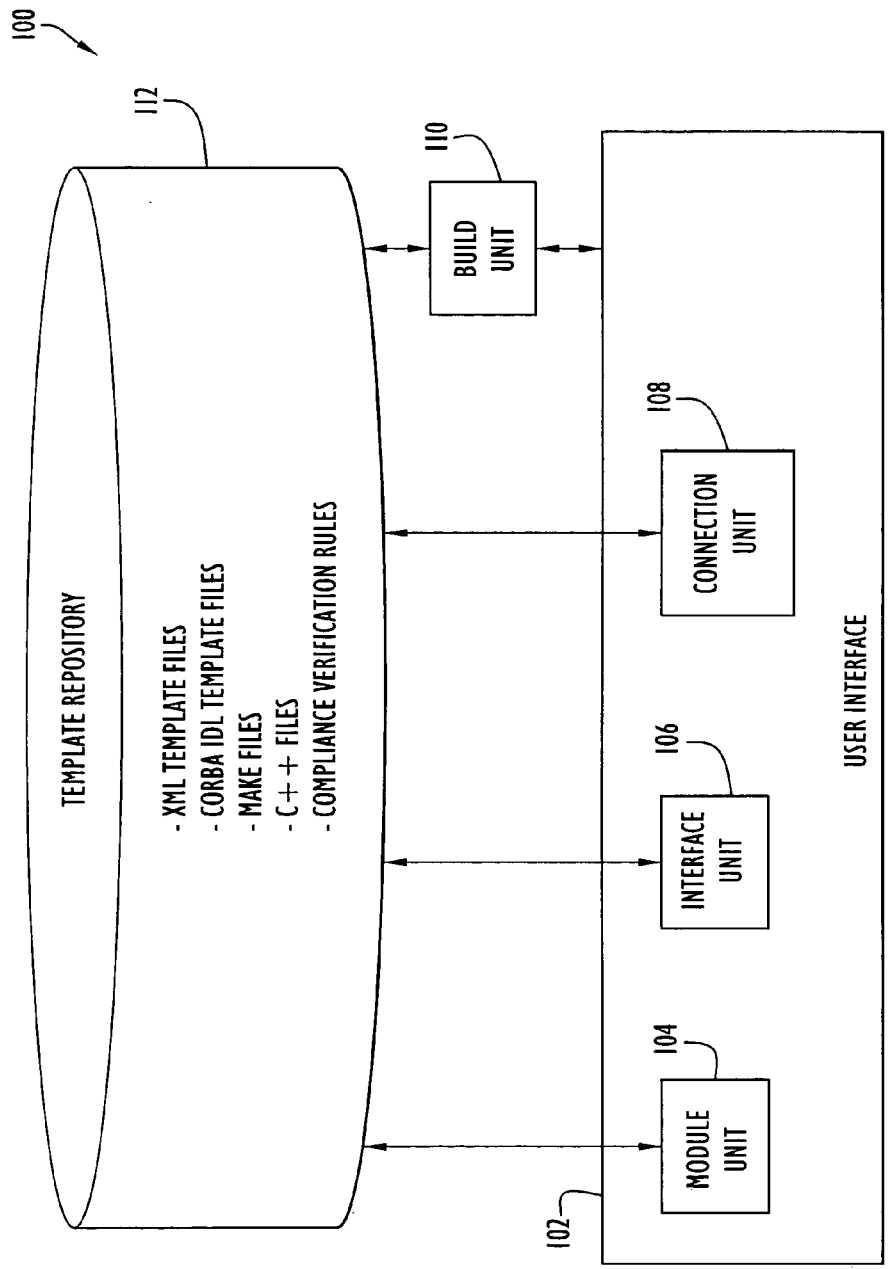
FIG. 1 is a block diagram of a software radio waveform application shell generator in accordance with an exemplary embodiment of the present invention.

FIG. 1 is a block diagram of a software radio waveform application shell generator 100 in accordance with an exemplary embodiment of the present invention. As shown in FIG. 1, shell generator 100 includes a user interface 102 which communicates, via integrated module unit 104, integrated interface unit 106, integrated connection unit 108 and a build unit 110, with a template repository 112 that contains configurable, software communication architecture (SCA) compliant, software radio source code templates for use in producing a software radio waveform application shell.

In accordance with the present invention, a user builds, via user interface 102, a high-level architecture model of a software radio waveform application under development. The high-level architecture model includes modules, interfaces, and connections presented to user interface 102 by module unit 104, interface unit 106 and connection unit 108 based upon software code templates stored in template repository 112. Once the model is completed, build unit 110 is used to generate a software radio waveform application shell based upon the model using templates retrieved from template repository 112.

In one non-limiting, representative embodiment, user interface 102 is a graphical user interface (GUI). As described above, module unit 104, interface unit 106, and connection unit 108 present module, interface and connection objects, respectively, to user interface 102 based upon the software radio source code templates stored within template repository 112. User interface 102 represents the defined objects as graphics objects within the user interface. In this manner, each graphics object available to a user via graphical user interface 102 for inclusion within a software radio high-level architecture graphical model is associated with a complimentary set of SCA compliant configurable software code templates stored within template repository 112. Once a graphics object is added to a model, the graphical object may be selected and a set of configuration parameters associated with the graphical object may be edited to tailor the associated configurable software templates to meet the needs of the software radio waveform application under development.

A user defines an SCA compliant software radio waveform application shell by adding, deleting and configuring graphics objects within graphical user interface 102. The manipulated graphics objects represent the modules, module interfaces and communication connections (i.e., software resources) that are used to support software radio waveform functions implemented within the final software radio waveform application. Building a graphical model of a software radio's high-level architecture in such a manner, results in an SCA compliant data abstraction that defines the software radio in terms of architecture compliant software resources, without addressing the waveform functionality supported by the respective architecture compliant software resources. The focus of the software radio high-level architecture graphical model is to define a data abstraction (i.e., in terms of defined software resources) and not waveform functionality (i.e., how the software resources are used).

Once the architectural model is defined and the respective components configured, a user can initiate build unit or module 110 to process the respective software radio software resource components and configuration parameters and to generate an SCA compliant software radio waveform application shell. The SCA compliant software radio waveform application shell includes sets of compatible software code templates retrieved from template repository 112 based upon the graphics objects (i.e., software resources) included within the model. Build unit 110 modifies configurable software code templates retrieved from template repository 112 based upon connectivity relationships and configuration parameters defined by the graphical model to implement a software radio waveform application shell that includes fully operational, SCA compliant, software radio software resource objects (i.e., modules, interfaces, and connections) that are compatible with the SCA core framework API's. For example, with respect to the JTRS SCA, the generated code includes all required CORBA IDL, XML, and C++ source code, as well as the make-files required to compile executable code that can be loaded and executed upon any SCA compatible hardware platform that supports a minimum set of SCA core framework services for which the software radio waveform application was designed.

A software radio waveform application shell, or application shell, generated using the SCA compliant template repository software templates includes stub object references (i.e., placeholder references) to skeleton software objects that must be populated to implement functional waveform(s) supported by the software radio waveform application. Stub object references embedded within the generated application shell software resource object code and skeleton functional waveform object code that corresponds to the inserted stub object references provide context sensitive guidance to waveform developers regarding the functional waveform objects that must be completed in order to implement an SCA compliant software radio waveform application that supports the desired target waveform(s). Application shell functional waveform objects are used to implement in a modular, isolated manner, the functional waveform specific characteristic of the software radio waveform application under development. However, functional waveform objects are entirely dependent upon the software resource objects that are generated by the software radio waveform application shell generator 100 of the present invention to access SCA core framework services via the SCA compliant core framework API's.

By controlling the generation of software radio waveform application software resource objects in such a manner, the method and apparatus of the present invention defines and enforces an additional layer of abstraction between software resource objects that control access to the SCA core framework API's and the functional waveform objects that implement software radio application waveform functionality. This additional abstraction layer assures that the physical abstraction layer (e.g., SCA core framework) API's are only accessed by verified, architecture compliant, software resource templates, assures that SCA guidance with respect to use of the physical abstraction layer API's is followed, and assures portability of the generated software radio waveform application to other SCA compliant platforms.

Preferably, user access to, and user configuration of, software radio resources is controlled in accordance with a set of SCA compliant rules. Such SCA compliant rules may be defined by a rule set integrated within the application shell generator source code and/or stored within template repository 112. The rule set may be referenced by module unit 104, interface unit 106, connection unit 108, and/or user interface 102 to guide a user's interaction with a software radio high-level architecture model and/or may be enforced by build unit 110. Use of such a governing rule set may be used to prevent a model from including modules, interfaces, connections and/or configuration parameters that are incompatible and/or not SCA compliant. For example, if a rule within the SCA compliant rule set requires that a software radio model contains only a single assembly controller module, module unit 104 and/or user interface 102 may deactivate remaining assembly controller module objects/graphics objects available for inclusion in a model once an assembly controller module has been added to the model. By way of a second example, a rule within the SCA compliant rule set may require inclusion and/or exclusion of certain modules, interfaces, connections and/or configuration parameters based upon modules, interfaces, connections and/or configuration parameters contained within a model.

An SCA compliant rule set can be enforced using both dynamic and/or manual verification techniques. Dynamic techniques may be used to automatically expand/restrict available user interface selections and/or automatically configure/reconfigure existing user selections to assure compliance with the SCA compliant rule set. Manually initiated techniques may be used to allow a user to periodically verify all or part of a software radio model with the SCA compliant rule set. For example, a user may request verification of all, or a portion of, a software radio model by pressing a verification button within the user interface. Depending upon the nature of the SCA compliance rule, appropriate compliance mechanisms may be implemented within and/or enforced by any and/or all components of the software radio waveform application shell generator 100, described above.

The shell generator of the present invention may be implemented by any type of computer or processing system (e.g., personal computer, mainframe, etc.) or circuitry. The functions of the shell generator modules may be distributed in any manner among any quantity (e.g., one or more) of hardware and/or software modules or units, computer or processing systems or circuitry. Template repository 112 may be implemented using a commercially available or specially developed database and/or directory/file system and/or any other storage units.

Use of verified, architecture compliant software resource templates preserves the integrity of the SCA core framework API's (i.e., the physical abstraction), thus assuring that a developed software radio application is portable across SCA compliant radio set platforms. The software radio waveform application shell generator of the present invention incorporates methods and techniques that are important to the software radio waveform application development community, including:

a. Standard Naming Conventions—SCA compliant software templates are used to implement a standard naming convention across the generated application shell source code, including: generated software resource objects, generated stub functional waveform object references, and generated skeleton functional waveform objects. In this manner, the software radio waveform application shell generator 100 promotes adherence to a consistent and meaningful naming convention across all software radio development projects accessing the same template repository.

b. Software Reuse—Use of verified SCA compliant software templates across multiple software radio waveform application development programs, promotes software reuse, resulting in significant development time and development cost reductions.

c. Consistency of Software Radio Designs—Use of verified SCA compliant software templates accessible via a controlled user interface that includes dynamic/manual verification of software resource components promotes consistent implementation of SCA guidelines across software radio designs.

d. Design Flexibility—Use of a verified, SCA compliant template repository provides developers with numerous verified template based alternatives, thereby providing design alternatives while the user interface and/or SCA compliance verification rule set holds designs within a controlled range of modification.

e. Incremental Improvement—Verified templates may be modified/improved and the new/revised template can be verified for SCA compliance and, once verified, made accessible via the verified template library to multiple development programs, thus promoting incremental improvement and organization-wide consistency regardless of the geographical location and/or security based compartmentalization of the individual development teams.

f. Inspection, Verification and Validation—Configuration management/review board management of template repository 112 provides a clean management level control point for monitoring templates for compliance with SCA base guidance and evolutionary/strategic target architectures.

As described above, the software radio waveform application shell generator 100 of the present invention allows a software radio application to be generated based upon a logical manipulation of high-level architectural components (e.g., modules, interfaces, communication connections, and related configuration parameters). Preferably, such manipulation is performed via a graphical user interface, as described above, in which graphics objects, each associated with sets of consistent verified templates, are manipulated to create a graphical model of the software radio application. Use of such high-level logical abstractions facilitate software radio development and addresses additional issues that are important to the software radio development community, including:

a. Elimination of Technology Learning Curves—Waveform developers no longer need to develop a detailed understanding of multiple programming technologies as well as the intricacies of the governing standard communication architecture before becoming a contributing member of a development team. Waveform engineers can contribute to a development team without in-depth knowledge of the implementation details.

b. Technology Independence—The logical abstraction of the high-level software radio design establishes true independence between the software radio design and the underlying technology used to implement the software radio. The SCA, SCA core infrastructure and/or SCA programming technologies can change without requiring every development engineer to retrain.

c. Cyclical Design/Test, Bench Tests and Collaborative Testing—A software radio application shell provides waveform developers with the software resource infrastructure support required to execute/test functional waveform software/code under development upon an SCA compliant platform. Use of application shell generator 100 allows developers to more easily bench-test new functional waveform object approaches/designs and to more easily collaborate with parallel design/implementation efforts by facilitating execution of collaborative milestone verification testing.

d. Adherence to Standard Architecture Guidance—The development environment of the present invention assures that architecture guidance and abstraction layers remain preserved. The development environment prevents/discourages developers from bypassing physical abstraction API's and/or implementing waveform functionality within physical device modules.

e. Traceability/Repeatability/Configuration Management—Creation of a high-level model based upon high-level objects and configurable parameters provides a concurrent record of the software radio under development. The constructed model can be efficiently stored, configuration controlled and used to generate subsequent application shells as new/modified templates are added to the template repository, thereby facilitating controlled, incremental change.

f. Development Resources/Development Cycle Time—The ability to quickly generate a software application using a verified library templates store based upon a high-level architectural model, greatly decreases development cycle time and reduces personnel resources required to build a software radio application.

g. Reduced Obsolescence—Reduced reliance upon the underlying programming technologies and ability to quickly regenerate software radio applications based on the current store of verified templates allows change to be introduced in a manner that is virtually transparent to concurrent development projects. In this manner, risks associated with embedded obsolescence is virtually eliminated.

Figure 2:
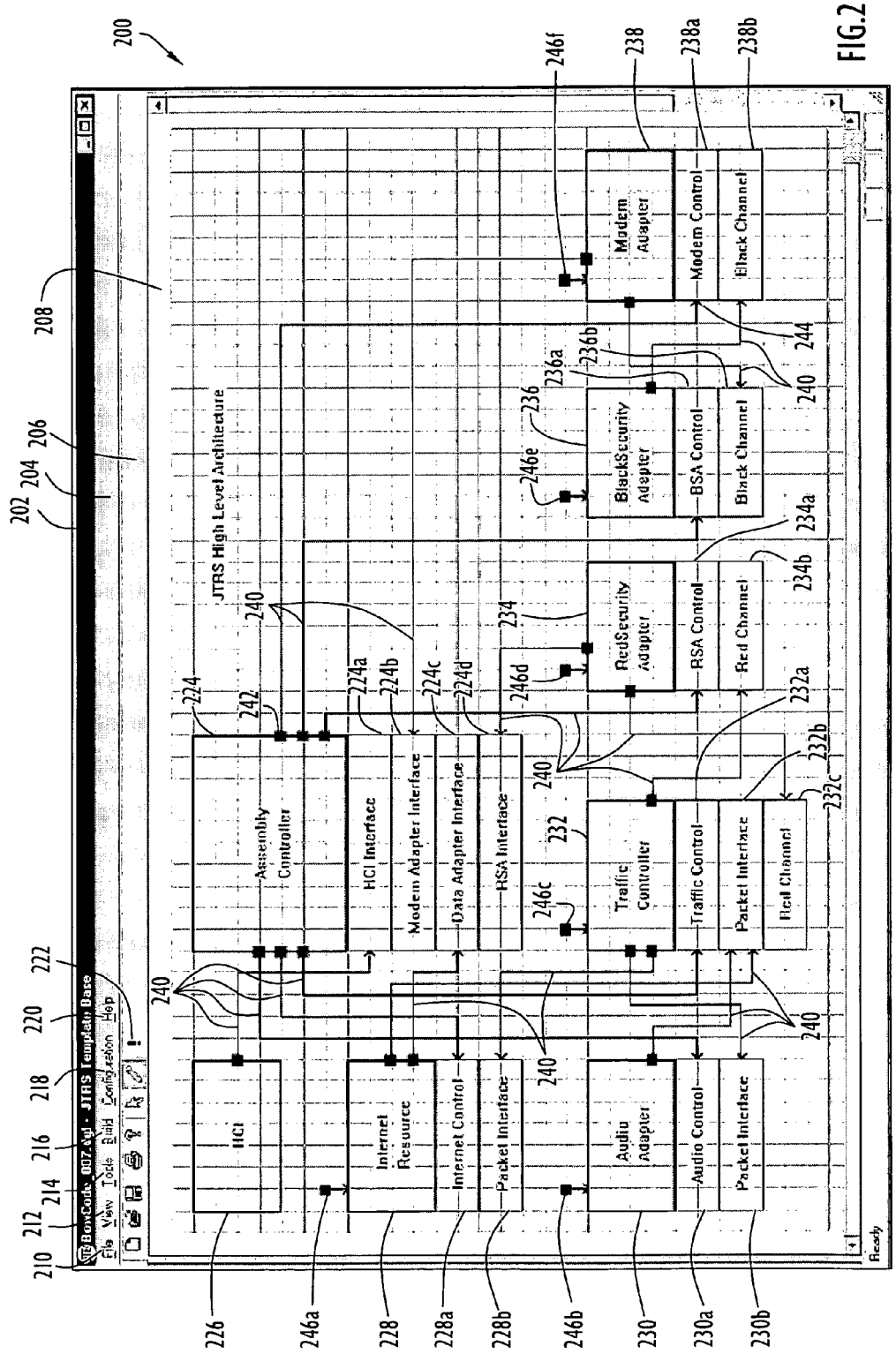
FIG. 2 is a schematic illustration of an exemplary shell generator graphical user interface (GUI) displaying a software radio data abstraction model in accordance with an exemplary embodiment of the present invention.

FIG. 2 illustrates an exemplary shell generator graphical user interface displaying a software radio high-level architecture model in accordance with an exemplary embodiment of the present invention. As shown in FIG. 2, a graphical user interface 200 in accordance with the present invention can include a title bar 202, drop-down menu bar 204, shortcut icon bar 206, and a model development area 208.

Typically title bar 202 identifies a name assigned to the application shell GUI and/or a file name assigned to the current software radio high-level architecture model displayed in development area 208. Drop-down menu bar 204 presents drop-down menu items, each menu item configured to display a set of selectable menu options that can be invoked by a user to build and configure a software radio model. Shortcut icon bar 206 presents icons that are shortcuts to often used drop-down menu selectable menu options. Development area 208 provides a drawing tablet based graphical area in which a user can build a graphical high-level architecture model of the software radio waveform application to be built.

With respect to the drop-down menu bar 204 shown in FIG. 2, file drop-down menu 210 presents options by which the user interface interacts with the directory and file system of the computer platform/operation system upon which the application shell generator 100 (FIG. 1) is executed. For example, file drop-down menu 210 can present options by which to open, close and/or save a file stored within the operating system's file directory that contains a defined software radio model built using the application shell generator of the present invention. File drop-down menu 210 may also support menu options used to identify to the application shell generator the location of a template repository, specify a directory location to which generated application shell files are to be stored and/or to specify the file/directory location of other information resources.

View drop-down menu 212 is typically used to alter the visual display of the software radio model. For example, view drop-down menu 212 may support zoom-in and zoom-out features for viewing all or portion of a software radio model development area 208, thus allowing software radio graphical models to use a development area 208 that is unrestricted in size. In addition, upon the user selecting a module, interface or connection, the view drop-down menu 212 may support options that allow the user to view configurable parameters specific to the selected item.

Tools drop-down menu 214 is typically used to add, delete and arrange the layout of graphical building blocks (i.e., module boxes, interface boxes, and connection lines) of a software radio model. For example, tools drop-down menu 214 may support operations to draw and align module boxes, draw and attach interface boxes to module boxes, and to draw and/or to position or shrink/expand connection lines between modules and/or interfaces. In one representative embodiment, a module box, interface box, and/or connection line added to the model is generic until the respective component is associated with an SCA compliant module, interface and/or connection via configuration drop-down menu 218, described below.

Build drop-down menu 216 is typically used to validate a software radio model and/or to generate a fully operational application shell based upon a complete and validated software radio model. For example, build drop-down menu 216 may include an operation to verify a defined and/or configured software radio model or selected portion of a model against a set of applicable SCA compliance rules, as described above, retrieved from the template repository. Once a model has been validated in such a manner, build drop-down menu 216 may allow a user to access other drop-down menu options that allow the user to generate a complete application shell, or a portion of an application shell, based upon the defined model or a selected portion of the defined model.

Configuration drop-down menu 218 is used to associate an SCA compliant set of module, interface and/or connection software templates defined within the template repository with a graphical representation of a module, interface and/or connection, respectively, that has been added to the model with tools drop-down menu 214, as described above. Further, configuration drop-down menu 218 allows a user to set user configurable parameters associated with SCA compliant modules, interfaces and/or connections. In one embodiment of the present invention, module unit 104, interface unit 106 and connection unit 108 communicate with user interface 102 to dynamically monitor software radio model development in accordance with an SCA compliance rule set, as described above. Based upon such dynamic monitoring, model configuration parameters may be dynamically updated and modules, interfaces and connections presented for selection by a user via the user interface to reflect SCA compliant options based upon the current state of the software radio model.

Model connections define communication conduits between modules and/or module interfaces through which one or more communication connections may be defined. Configuration drop-down menu 218 can also be used to define/configure the respective model connections. Each defined connection establishes a communication path across which control and/or data communication signals can pass. In one embodiment, the application shell generator automatically populates the user configurable configuration model parameters with default values consistent with other modules, interfaces and connections included and/or configured within the model. Such default values may include defining a default connection in accordance with an applied naming convention and the stored SCA compliant rule set.

Help drop-down menu 220 is typically used by a user to access on-line help associated with operation of graphical user interface 200. Via help drop-down menu 220, a user can access an index of useful instructions on the use and operation of the application shell generator and associated user interface features. In one embodiment, a user can select a model feature within the user interface model development area 208, and click upon help drop-down menu 218 to review helpful tips and guidance related to the selected feature.

As shown in FIG. 2, a graphical high-level architecture model of the software radio waveform application can include modules, module interfaces and module/interface connections. For example, assembly controller modules 224 and corresponding module interfaces 224A-D represent a set of software resources that are to be included in the software radio waveform application under development. Interface connections 240, as described above, define communication conduits between modules and/or module interfaces through which data and/or control communication signals can pass.

The software radio model shown in FIG. 2 depicts several exemplary conventions. Modules are displayed using bold-lined boxes and interfaces supported by a module are displayed as consecutively adjacent boxes coupled to the module from below. A connection is displayed as a line between two modules, between a module and an interface, or between two interfaces. A small solid box on one end of a connection identifies that end of the connection as a user port and identifies the module/interface associated with the user port as a connection user. A small arrow on an end of a connection identifies that end of the connection as a provider port and the module/interface associated with the user port as a connection provider. As described above, tools drop-down menu 214 can be used to shrink connection lines in order to simplify the graphical model layout. For example, as shown in FIG. 2 at 246A-E, a connection can be depicted in the model without extending the graphical representation of the connection to the defined connection user. Another helpful technique that simplifies interpretation of model connections is the use of color codes. For example a red connection can designate use of the connection to send/receive data; a blue connection can designate use of the connection to send/receive control information.

A software radio module or interface depicted within FIG. 2 represents a set of software objects that implement the features and capabilities of the respective module or interface. By way of example, a connection user (i.e., identified by the square end of a connection) can access all objects included within a connection provider (i.e., identified by the arrow end of a connection) and hence all features and capabilities supported by the connection provider module/interface. A module interface defines a select subset of software objects that support a specific subset of operations. Therefore, a connection in which a module interface is defined as the connection provider provides the connection user with access to only those objects that implement the specific features and capabilities included within the module interface.

The exemplary high-level architecture model of a software radio waveform application shown in FIG. 2 includes, by way of example only, eight modules, seventeen module interfaces, and twenty-three communication paths. Specifically, the exemplary model includes: an assembly controller module 224 with human computer interface 224A, modem adapter interface 224B, data adapter interface 224C and red security adapter interface 224D; a human computer input module 226; an internet resource module 228 with internet control interface 228A and packet interface 228B; an audio adapter module 230 with audio control interface 230A and packet interface 230B; a traffic controller module 232 with traffic control interface 232A, packet interface 232B and red channel interface 232C; a red security adapter module 234 with red security adapter control interface 234A and red channel interface 234B; a black security adapter module 236 with black security adapter control interface 236A and black channel interface 236B; and a modem adapter module 238 with modem control interface 238A and black channel interface 238B.

The main assembly controller module 224 serves as the software radio waveform application's central controller and is configured to receive input from and to coordinate operations performed by supporting software resource modules defined within the model for the software radio waveform application under development. Typically, a software radio includes only a single assembly controller. In one embodiment, described above, the user can specify high-level, SCA compliant, software radio characteristics via configuration drop-down menu 218 and the application shell user interface will present to the user a set SCA compliant assembly controller modules consistent with the user specified characteristics. Additional modules, interfaces and connections are typically added to the model and configured by a user, in a similar manner, until the model includes a set of SCA compliant software modules, interfaces and connections capable of implementing the software resources needed to support the software radio target waveform.

Figure 3:
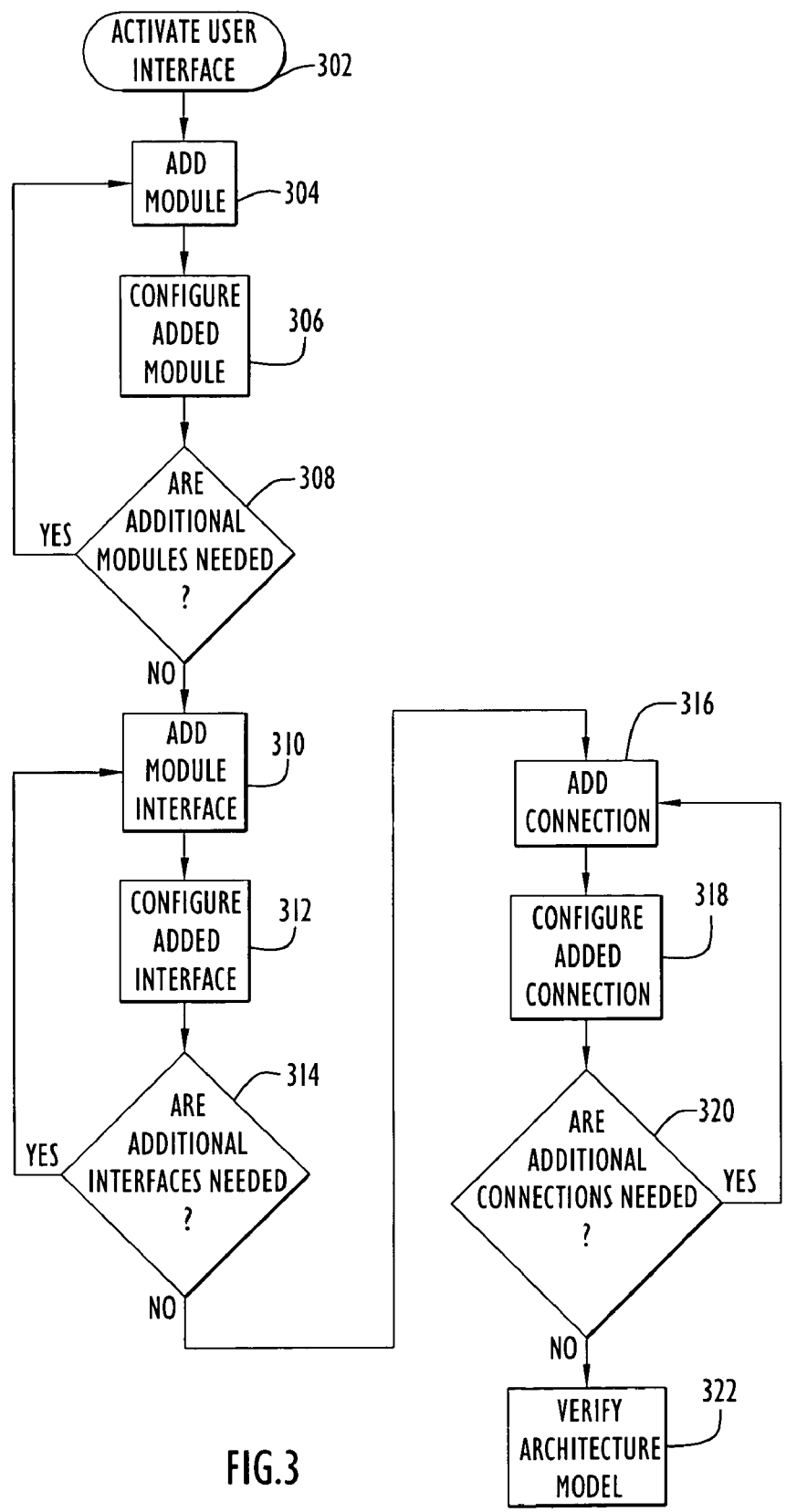
FIG. 3 is a process flow diagram illustrating the manner in which a standard architecture compliant data abstraction of a software radio is built in accordance with an exemplary embodiment of the present invention.

FIG. 3 is a process flow diagram illustrating the manner in which the shell generator user interface builds a standard architecture compliant data abstraction, or model, of a software radio in accordance with an exemplary embodiment of the present invention. The process flow depicted in FIG. 3, is independent of the nature of the user interface used. For example, the same process flow shown in FIG. 3 can be used with a graphics based user interface and/or a command line based user interface. As shown in FIG. 3, upon activating, at step 302, the application shell generator user interface, a high-level architecture software radio waveform application model is initiated by adding, at step 304, a software resource module to the model and configuring, at step 306, the newly added module as described above via module unit 104 (FIG. 1). Typically, the first module added to a model is configured as an assembly controller module, as described above. A user is able to select any assembly controller that is stored in template repository 112 (FIG. 1) and presented by module unit 104 to user interface 102, as described above. Upon determining, at step 308, that additional modules are required, the process flow returns to step 304 to allow the user to add another software resource module.

Otherwise, upon determining, at step 308, that no additional modules are required, the user selects a module and adds, at step 310, an interface to the selected module and configures, at step 312, the new interface, as described above via interface unit 106 (FIG. 1). Upon determining, at step 314, that additional interfaces are required, the process flow returns to step 310 to allow the user to add another interface to the same module or to another selected module.

Otherwise, upon determining, at step 314, that no additional interfaces are required, the user proceeds to add, at step 316, a communication connection between the defined modules and/or interfaces and to configure, at step 318, the defined connection as described above via connection unit 108 (FIG. 1). Upon determining, at step 320, that additional connections are required, the process flow returns to step 316 to allow the user to add and configure additional connections.

Upon determining, at step 320, that all communication connections required to support communications between the software radio software resource modules have been defined, the high-level architecture software radio waveform application model can be optionally verified, as described above via build unit 110, against SCA compliant rules stored within template repository 112 (FIG. 1). Verifying the modules, module interfaces, communication connections and associated configuration parameters, supports enforcement of SCA guidance without requiring developers to possess in depth knowledgeable of the chosen SCA. The stored SCA compliant rules represent SCA expert knowledge stored as a set of rules and conditions that can be applied to a high-level architecture software radio waveform application model, the model's respective software resources and configuration parameters.

Figure 4:
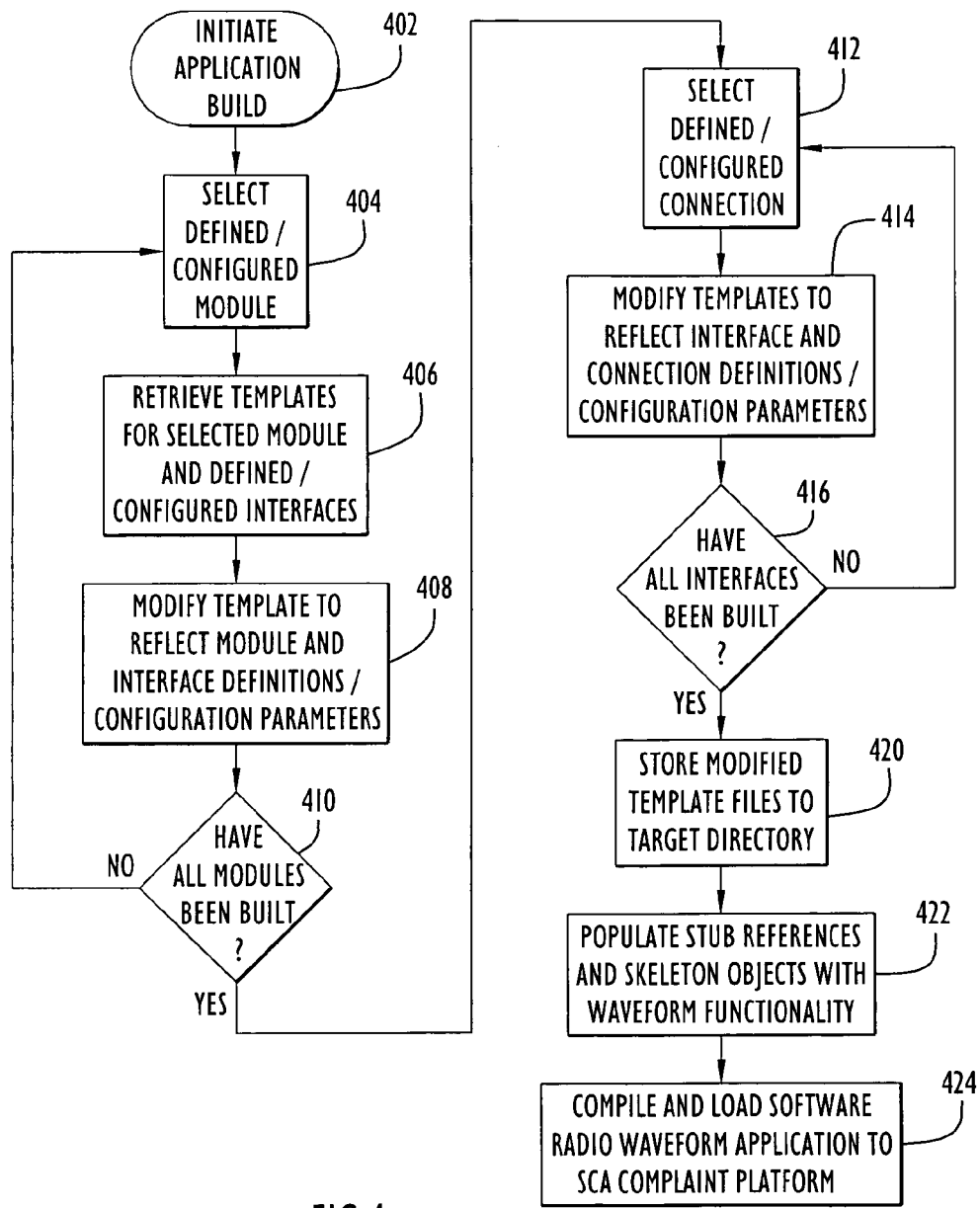
FIG. 4 is a process flow diagram illustrating the manner in which a standard architecture compliant software radio waveform application shell is generated based upon a data abstraction model of a software radio in accordance with an exemplary embodiment of the present invention.

FIG. 4 is a process flow diagram illustrating the manner in which a standard architecture compliant software radio waveform application shell is generated based upon a high-level architecture software radio data abstraction developed and verified as described above with respect to FIG. 3. For example, an application build process can be initiated by the application shell generator user interface described with respect to FIG. 2 via the build drop-down menu 216 or by clicking upon a build shortcut icon 222 to cause build unit 110 (FIG. 1) to initiate an application build process based upon the software radio model displayed within the user interface.

With respect to FIG. 4, upon initiating, at step 402, an application build, build unit 110 (FIG. 1) selects, at step 404, a defined/configured module from the architecture model and retrieves, at step 406, from template repository 112 a set of configurable software templates that is associated with the selected module and the module's defined/configured interfaces. The retrieved software templates may include files written in any number of SCA compliant programming languages required to support the software radio under development. In one exemplary embodiment, the retrieved template files include templates written in XML, C++, IDL and text based Makefiles. However, the present invention should not be construed to be limited to the use of any specific SCA and/or programming language and/or syntax structures.

At step 408, the build module modifies the retrieved templates in accordance with configuration parameters specified by the user via user interface 102 (FIG. 1) for the module and each module interface. If, at step 410, the build unit determines that additional modules defined within the model require processing, the process flow returns to step 404 and another module is selected and processed, as described above.

If, at step 410, the build unit determines that all modules defined within the model have been processed, the build module selects, at step 412, a connection defined within the model and further modifies, at step 414, the retrieved templates to reflect connection definitions and configurations. If, at step 416, the build unit determines that additional connections defined within the model require processing, the process flow returns to step 412 and another module connection is selected and processed, as described above.

Upon determining, at step 416, that all connections defined within the model have been processed, the build unit stores, at step 420, the modified template files (i.e., the application shell) to a file directory identified by the user interface, as described above. In one embodiment, the stored files include C++ source code, software resource module XML, general purpose processor XML, CORBA IDL and make files required to generate a software radio waveform application shell. Functional waveform stub references and functional waveform skeleton objects embedded within the generated application shell as placeholders are populated, at step 422, with software instructions/code that implement waveform specific functionality. Once waveform functionality has been added to the application shell, the software radio waveform application is compiled and loaded, at step 424 upon a target SCA compliant platform.

By separating implementation of software radio waveform functionality (i.e., what the radio does) from implementation of software radio software resources, as described above with respect to FIG. 4, the method and apparatus of the present invention defines and enforces an additional layer of abstraction between software resource objects that control access to the SCA core framework API's and the functional waveform objects that implement software radio application waveform functionality. This additional abstraction layer assures that the physical abstraction layer (e.g., SCA core framework)

API's are only accessed by verified, architecture compliant, software resource templates, assures that SCA guidance with respect to use of the physical abstraction layer API's is followed, and assures portability of the generated software radio waveform application to other SCA compliant platforms.

Further, the ability to quickly generate a software application using verified library templates stored based upon a high-level architectural model, as described above with respect to FIG. 4, greatly decreases development cycle time and reduces personnel resources required to build a software radio application. A software radio application shell provides waveform developers with the software resource infrastructure support required to execute/test functional waveform software/code under development upon an SCA compliant platform. Use of application shell generator 100 allows developers to more easily bench-test new functional waveform object approaches/designs and to more easily collaborate with parallel design/implementation efforts by facilitating execution of collaborative milestone verification testing.

It may be appreciated that the embodiments described above and illustrated in the drawings represent only a few of the many ways of implementing a method and apparatus for developing standard architecture compliant software for programmable radios. The present invention is not limited to the specific embodiments disclosed herein, but may be used to support any application generator that supports the generation of open architecture executable software for an open architecture hardware platform.

The application generator described here can be implemented in any number of units, or modules, and is not limited to any specific software module architecture. Each module can be implemented in any number of ways and is not limited in implementation to execute process flows precisely as described above. The application generator described above and illustrated in the flow charts and diagrams may be modified in any manner that accomplishes the functions described herein. It is to be understood that various functions of the application generator may be distributed in any manner among any quantity (e.g., one or more) of hardware and/or software modules or units, computer or processing systems or circuitry. The application shell generator may execute on a local computer, a remote computer, and/or any combination of local and remote computers. Application shell generator modules and/or information stores accessed by the module may be stored locally and/or distributed across any combination of local and remote computers. Local and/or remote computers may be connected using any number of direct connections and/or network based connections, including local network (e.g., local area network) connections, wide area network (WAN) connections and/or Internet based connections. The application generator of the present invention is not limited to use in the generation software radio waveform applications, but may be used to generate portable, standards compliant software for execution upon a wide range of military and civilian equipment. For example, the architecture compliant applications generated using the application generator of the present invention can be implemented by any number of personal or other type of computer or programmable device (i.e., any programmable communication or processing device). Further, use of the methods and apparatus of the present invention for generating portable, standards compliant executable applications containing tailored functional capability may be applied to any future open/proprietary standard architecture based civilian and/or military programmable device.

The application shell generator may be implemented upon any computer (e.g., personal computer, mainframe, workstation, etc.). The application shell generator may be executed within any available operating system that supports a command line and/or graphical user interface (e.g., Windows, OS/2, Unix, Linux, DOS, etc.). The application shell generator user interface may employ a graphical user interface, and/or a command line interface, and/or any manner of receiving user input using local and/or remote input devices. The user interface may use any type and/or combination of symbols for objects, interfaces, input/output (I/O) ports and/or any combination of user I/O devices.

An application generated by the application shell generator, may be loaded upon any designated target platform executing any proprietary standard or open standard compliant hardware platform and/or any proprietary or open standards compliant operating system and/or application program interface. It is to be understood that the application shell generator may be implemented in any desired computer language, and could be developed by one of ordinary skill in the computer and/or programming arts based on the functional description contained herein and the flow charts illustrated in the drawings. Moreover, the application shell generator software may be available or distributed via any suitable medium (e.g., stored on devices such as CD-ROM and diskette, downloaded from the Internet or other network (e.g., via packets and/or carrier signals), downloaded from a bulletin board (e.g., via carrier signals), or other conventional distribution mechanisms).

It is to be understood that the application shell generator may generate application files in any desired computer language and/or combination of computer languages that form a standalone executable and/or combination of executables that interface with any standard and/or proprietary hardware device, device operating system or API. An application generated with the application shell generator of the present invention may be installed and executed on any operating/hardware platform and may be performed on any quantity of processors within the executing system or device.

The application shell generator may accommodate any quantity and any type of data files and/or databases or other structures and may store SCA compliant templates and/or SCA verification rules in any desired file and/or database format (e.g., ASCII, binary, plain text, or other file/directory service and/or database format, etc.). Further, any references herein to software performing various functions generally refer to processors performing those functions under software control. Such processors may alternatively be implemented by hardware or other processing circuitry. The various functions of the application shell generator may be distributed in any manner among any quantity (e.g., one or more) of hardware and/or software modules or units. Processing systems or circuitry, may be disposed locally or remotely of each other and communicate via any suitable communications medium (e.g., hardwire, wireless, etc.). The software and/or processes described above and illustrated in the flow charts and diagrams may be modified in any manner that accomplishes the functions described herein.

From the foregoing description, it may be appreciated that the present invention includes a method and apparatus for developing standard architecture compliant software for programmable radios, wherein a software radio waveform application shell generator efficiently and effectively develops software defined radio waveform applications in accordance with any selected software communication architecture.

Having described preferred embodiments of a method and apparatus for developing standard architecture compliant software for programmable radios, it is believed that other modifications, variations and changes may be suggested to those skilled in the art in view of the teachings set forth herein. It is therefore to be understood that all such variations, modifications and changes are believed to fall within the scope of the present invention as defined by the appended claims.

What is claimed is:

1. A system for generating source code for a radio application executable upon a software architecture compliant radio platform, wherein said application includes a set of software resources that communicate with the platform via a set of software architecture compliant interfaces to provide the application with access to physical services supported by the platform, the system comprising:

a repository unit to store a plurality of configurable source code templates each associated with and containing source code implementing a corresponding software resource of said radio application; and a processing system to generate said radio application source code and including:

a graphical user interface employing a plurality of user-manipulable graphics objects representing said software resources of said radio application and corresponding links between those resources to draw a graphical model defining said radio application, wherein said graphical user interface enables a user to select a first set of graphics objects associated with said templates and indicating software resources to include within the generated radio application source code, to manipulate a second set of graphics objects to indicate said links and specify relationships between selected software resources and to specify configuration parameters for the selected software resources, and wherein said graphical user interface includes a graphical development area to enable said user to draw said graphical model defining said radio application via arrangement of said first and second sets of graphics objects within said graphical development area representing said selected software resources and corresponding links; and a build unit to analyze said graphical model and retrieve said templates from said repository unit corresponding to said software resources within said graphical model represented by said selected first set of graphics objects and to modify said retrieved templates in accordance with said specified relationships and said specified configuration parameters to generate said radio application source code in accordance with said specified relationships and said specified configuration parameters.

2. The system of claim 1, wherein the generated application source code includes one of stub references and skeleton code configured to support inclusion of functional source code to implement application specific functions.

3. The system of claim 1, wherein the software architecture is a Joint Tactical Radio System software communication architecture.

4. The system of claim 1, wherein the generated application source code includes source code of at least one programming language compatible with the software architecture.

5. The system of claim 1, wherein the generated application source code includes source code of at least one of C++, CORBA IDL, and XML programming languages.

6. The system of claim 1, wherein said graphical development area enables a user to define an application by at least one of adding, deleting and configuring said first and second sets of graphics objects within the graphical development area.

7. The system of claim 1, wherein the repository unit includes a database.

8. The system of claim 1, wherein the repository unit includes a directory file system.

9. The system of claim 1, wherein said specified relationships between software resources include communication connections between said software resources.

10. The system of claim 9, wherein said configuration parameters include parameters that configure the specified communication connections.

11. The system of claim 1, wherein said configurable templates include software resource interfaces each associated with a software resource to provide limited access to services supported by the associated software resource.

12. The system of claim 1, wherein said processing system further includes:

a verify module to verify at least one of configurable templates, relationships and configuration parameters specified by the user via the graphical user interface against a software architecture compliant rule set associated with the software architecture, wherein the rule set is stored within the repository unit.

13. A method for generating source code for a radio application executable upon a software architecture compliant radio platform, wherein said application includes a set of software resources that communicate with the platform via a set of software architecture compliant interfaces to provide the application with access to physical services supported by the platform, the method comprising:

(a) storing a plurality of configurable source code templates each associated with and containing source code implementing a corresponding software resource of said radio application within a template repository and providing software resources to include within the generated radio application source code via a graphical user interface employing a plurality of user-manipulable graphics objects representing said software resources of said radio application and corresponding links between those resources to draw a graphical model defining said radio application, wherein said graphical user interface enables user selection of a first set of graphics objects associated with said templates and indicating software resources to include within the generated radio application source code and user manipulation of a second set of graphics objects to indicate said links;

(b) specifying relationships between selected software resources via said graphical user interface and specifying configuration parameters for the selected software resources, wherein said graphical user interface includes a graphical development area to enable said user to draw said graphical model defining said radio application via arrangement of said first and second sets of graphics objects within said graphical development area representing said selected software resources and corresponding links; and (c) analyzing said graphical model and retrieving said templates from said template repository corresponding to said software resources within said graphical model represented by said selected first set of graphics objects and modifying said retrieved templates in accordance with said specified relationships and said specified configuration parameters to generate said radio application source code in accordance with said specified relationships and said specified configuration parameters.

14. The method of claim 13, wherein step (c) further includes:

(c.1) generating said application source code to include one of stub references and skeleton code configured to support inclusion of functional source code to implement application specific functions.

15. The method of claim 13, wherein step (c) further includes:
(c.1) generating application source code that is compliant with a Joint Tactical Radio System software communication architecture.

16. The method of claim 13, wherein step (c) further includes:
(c.1) generating application source code that includes source code of at least one programming language compatible with the software architecture.

17. The method of claim 13, wherein step (c) further includes:
(c.1) generating application source code that includes source code of at least one of C++, CORBA IDL, and XML programming languages.

18. The method of claim 13, wherein step (b) further includes:
(b.1) defining an application by at least one of adding, deleting and configuring said first and second sets of graphics objects within said graphical development area.

19. The method of claim 13, wherein step (a) further includes:
(a.1) storing the plurality of configurable source code templates within a database.

20. The method of claim 13, wherein step (a) further includes:
(a.1) storing the plurality of configurable source code templates within a directory file system.

21. The method of claim 13, wherein step (b) further includes:
(b.1) specifying communication connections between selected software resources.

22. The method of claim 21, wherein step (b.1) further includes:
(b.1.1) configuring the specified communication connections.

23. The method of claim 13, wherein step (a) further includes:
(a.1) storing templates corresponding to interfaces each associated with a software resource to provide limited access to services supported by the associated software resource.

24. The method of claim 13, wherein step (c) further includes:
(c.1) verifying at least one of configurable templates, relationships and configuration parameters against a software architecture compliant rule set associated with the software architecture.

25. The method of claim 24, wherein step (a) further includes:
(a.1) storing the software architecture compliant rule set.

26. A program storage device having a computer readable medium with computer program logic recorded thereon for generating source code for a radio application executable upon a software architecture compliant radio platform, wherein said application includes a set of software resources that communicate with the platform via a set of software architecture compliant interfaces to provide the application with access to physical services supported by the platform, said program storage device comprising:
a storage unit to store a plurality of configurable source code templates each associated with and containing source code implementing a corresponding software resource of said radio application in a repository unit;
a graphical user interface employing a plurality of user-manipulable graphics objects representing said software resources of said radio application and corresponding links between those resources to draw a graphical model defining said radio application, wherein said graphical user interface enables a user to select a first set of graphics objects associated with said templates and indicating software resources to include within the generated radio application source code, to manipulate a second set of graphics objects to indicate said links and specify relationships between selected software resources and to specify configuration parameters for the selected software resources, and wherein said graphical user interface includes a graphical development area to enable said user to draw said graphical model defining said radio application via arrangement of said first and second sets of graphics objects within said graphical development area representing said selected software resources and corresponding links; and
a build unit to analyze said graphical model and retrieve said templates from said repository unit corresponding to said software resources within said graphical model represented by said selected first set of graphics objects and to modify said retrieved templates in accordance with said specified relationships and said specified configuration parameters to generate said radio application source code in accordance with said specified relationships and said specified configuration parameters.

27. The program storage device of claim 26, wherein the generated application source code includes one of stub references and skeleton code configured to support inclusion of functional source code to implement application specific functions.

28. The program storage device of claim 26, wherein the software architecture is a Joint Tactical Radio System software communication architecture.

29. The program storage device of claim 26, wherein the generated application source code includes source code of at least one programming language compatible with the software architecture.

30. The program storage device of claim 26, wherein the generated application source code includes source code of at least one of C++, CORBA IDL, and XML programming languages.

31. The program storage device of claim 26, wherein the graphical development area enables a user to define an application by at least one of adding, deleting and configuring said first and second sets of graphics objects within the graphical development area.

32. The program storage device of claim 26, wherein the repository unit includes a database.

33. The program storage device of claim 26, wherein the repository unit includes a directory file system.

34. The program storage device of claim 26, wherein said specified relationships between software resources includes communication connections between said software resources.

35. The program storage device of claim 34, wherein said configuration parameters include parameters that configure the specified communication connections.

36. The program storage device of claim 26, wherein said configurable templates include software resource interfaces each associated with a software resource to provide limited access to services supported by the associated software resource.

37. The program storage device of claim 26, further comprising:

a verify module to verify at least one of configurable templates, relationships and configuration parameters specified by the user via the graphical user interface against a software architecture compliant rule set associated with the software architecture, wherein the rule set is stored within the repository unit.

* * * * *